(12) United States Patent
Moon et al.

(10) Patent No.: US 9,371,091 B2
(45) Date of Patent: Jun. 21, 2016

(54) PARKING ASSIST SYSTEM AND METHOD

(71) Applicants: Hyundai Motor Company, Seoul (KR);
Kia Motors Corporation, Seoul (KR)

(72) Inventors: Kyohoon Moon, Gyeonggi-Do (KR);
Hyoun Soo Han, Gyeonggi-Do (KR)

(73) Assignees: Hyundai Motor Company, Seoul (KR);
Kia Motors Corporation, Seoul (KR)

( * ) Notice: Subject to any disclaimer, the term of this patent is extended or adjusted under 35 U.S.C. 154(b) by 133 days.

(21) Appl. No.: 14/100,772

(22) Filed: Dec. 9, 2013

(65) Prior Publication Data

US 2014/0188339 A1   Jul. 3, 2014

(30) Foreign Application Priority Data

Dec. 27, 2012 (KR) .......................... 10-2012-0155363

(51) Int. Cl.
*G06F 7/00* (2006.01)
*B62D 6/00* (2006.01)
*B62D 15/02* (2006.01)

(52) U.S. Cl.
CPC ................................. *B62D 15/0285* (2013.01)

(58) Field of Classification Search
CPC ................................................. B62D 15/0285
USPC ............................................................ 701/41
See application file for complete search history.

(56) References Cited

U.S. PATENT DOCUMENTS

2010/0235053 A1* 9/2010 Iwakiri et al. .................. 701/42
2012/0173080 A1* 7/2012 Cluff .............................. 701/42

FOREIGN PATENT DOCUMENTS

| JP | 2001-071780 A | 3/2001 |
| JP | 2009-101970 A | 5/2009 |
| KR | 10-2012-0032198 A | 4/2012 |
| KR | 10-2012-0040789 A | 4/2012 |
| KR | 10-2012-0117404 A | 10/2012 |

* cited by examiner

*Primary Examiner* — Redhwan K Mawari
*Assistant Examiner* — Rodney P King
(74) *Attorney, Agent, or Firm* — Mintz Levin Cohn Ferris Glovsky and Popeo, P.C.; Peter F. Corless (57) ABSTRACT

A parking assist system and method that includes a plurality of ultrasonic wave sensors configured to measure a distance between a host vehicle and an external object and an motor driven power steering controller configured to operate steering of the host vehicle. In addition, a controller is configured to detect a parallel parking space based on distances measured from the plurality of ultrasonic wave sensors and to perform an exit from the parallel parking space while operating a steering angle through cooperative control with the MDPS controller.

13 Claims, 6 Drawing Sheets

PARKING ASSIST SYSTEM AND METHOD

CROSS-REFERENCE TO RELATED APPLICATION

This application claims priority to and the benefit of Korean Patent Application No. 10-2012-0155363 filed in the Korean Intellectual Property Office on Dec. 27, 2012, the entire contents of which are incorporated herein by reference.

BACKGROUND (a) Field of the Invention

The present invention relates a parking assist system and method. More particularly, the present invention relates to the parking assist system and method that assists a driver in exiting from a parallel parking space by controlling a parking trajectory and steering angle.

(b) Description of the Related Art

To guide a vehicle to a destination automatically, a relationship between a target route and a present location of a vehicle is monitored in real time. Thus, estimating the present location of the vehicle is important. In general, estimating the location of the vehicle is determined based on a controlled steering angle and a moving distance measured by a yaw rate sensor and a wheel speed sensor.

For example, a parking assist system using a estimated location information by the above-mentioned method may include a controller configured to calculate a steering angle based on the estimated location information and a parking trajectory and generate a control command signal, a motor configured to rotate in a forward or reverse direction at a predetermined angle based on the command signal from the controller, and a driving unit connected with a shaft of the motor and having a gear portion that generates a predetermined moment of rotation.

The parking assist system guides the vehicle to a parking space measured by sensors without a collision with an obstacle. Among parking assist systems, parking performance may be determined based on alignment after parking a vehicle. In parallel parking, a parking trajectory is generated from a present location to a target location between edges of two parked vehicles.

A typical parking assist system requests a reverse shift-speed when exiting from a parallel parking space regardless of front and rear spaces, and a minor collision may occur when the vehicle is substantially close to a parked vehicle.

The above information disclosed in this section is only for enhancement of understanding of the background of the invention and therefore it may contain information that does not form the prior art that is already known in this country to a person of ordinary skill in the art.

SUMMARY

The present invention provides a parking assist system and method having advantages of preventing a minor collision when exiting from a parallel parking space.

An exemplary embodiment of the present invention provides a parking assist system that may include: a plurality of ultrasonic wave sensors that measure a distance between a host vehicle and an external object; a motor driven power steering (MDPS) controller configured to execute steering of the host vehicle; and a controller configured to detect a parallel parking space based on distances measured from the plurality of ultrasonic wave sensors and to execute an exit from the parallel parking space while executing steering angle via cooperative control with the MDPS controller.

The plurality of ultrasonic wave sensors may be disposed frontward, rearward, and at both sides of the host vehicle. The controller may be configured to determine a distance between the host vehicle and a forward vehicle, and a distance between the host vehicle and a rearward vehicle, using the plurality of ultrasonic wave sensors.

In addition, the controller may be turned on and may be configured to perform parking assistance when a switch is turned on when exiting from the parallel parking space. The controller may be configured to request a forward shift-speed from a driver when the host vehicle is in a predetermined proximity to the rearward vehicle. Further, the controller may be configured to determine that the host vehicle is in the predetermined proximity of the rearward vehicle when the distance between the host vehicle and the rearward vehicle is shorter than a first threshold distance. When the forward shift-speed is set, the controller and the MDPS controller may be converted to an automatic steering control mode.

The parking assist system may further include a neutral switch when the host vehicle is a manual transmission vehicle and the controller may be configured to receive shift-speed information from the neutral switch. The controller may be configured to determine that the forward shift-speed is set when the shift-speed is not determined as neutral and a reverse shift-speed based on received shift-speed information. The controller may further be configured to request a forward shift-speed from a driver when the host vehicle is in at predetermined distance from the forward vehicle. The controller may be configured to determine that the host vehicle is within the predetermined distance to the forward vehicle when the distance between the host vehicle and the forward vehicle is greater than a second threshold distance.

BRIEF DESCRIPTION OF THE DRAWINGS

FIG. 4A to FIG. 4C show exemplary steps of performing an exit from a parallel parking space according to an exemplary embodiment of the present invention.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g., fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

In the following detailed description, exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification and claims which follow, unless explicitly described to the contrary, the word "comprise/include" and variations such as "comprises/includes" or "comprising/including" will be understood to imply the inclusion of stated elements but not the exclusion of any other elements.

Figure 1:
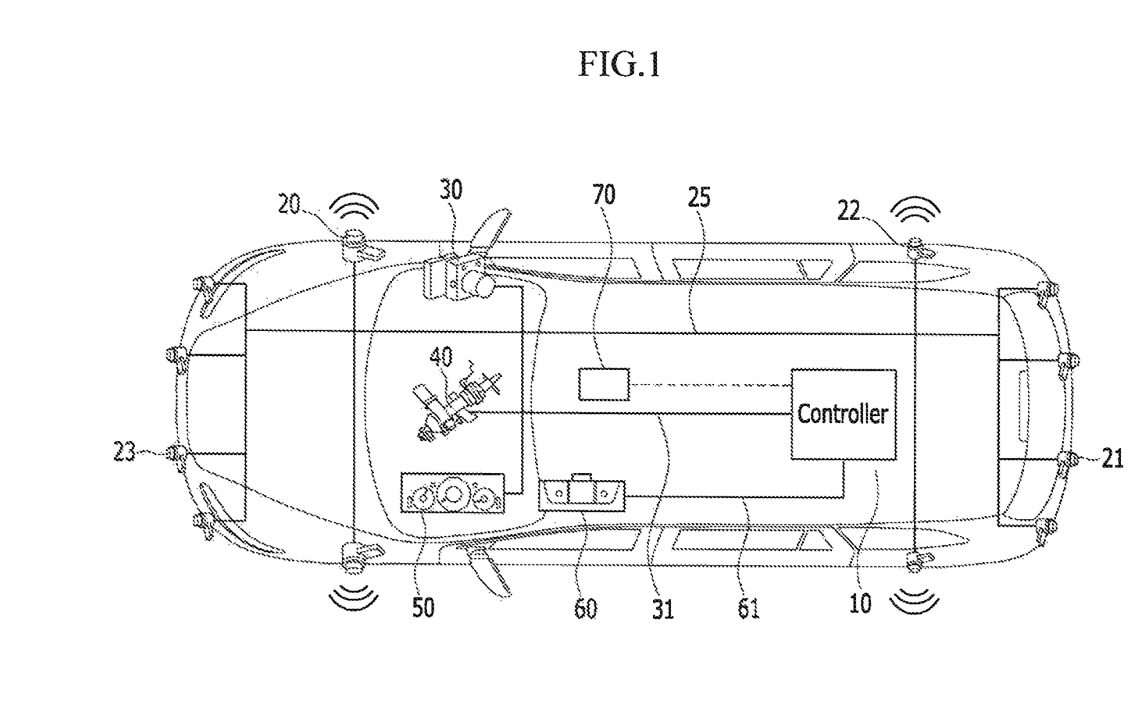
FIG. 1 is an exemplary schematic diagram of a parking assist system according to an exemplary embodiment of the present invention.

FIG. 1 is an exemplary schematic diagram of a parking assist system according to an exemplary embodiment of the present invention.

Referring to FIG. 1, a parking assist system according to an exemplary embodiment of the present invention may include a plurality of ultrasonic wave sensors 20, 21, 22, and 23, and a controller 10 configured to receive distance information from the plurality of ultrasonic wave sensors and execute smart parking (e.g., assisted parking). Specifically, the system includes a controller that receives signals from a wheel pulse generator 30, a motor driven power steering (MDPS) controller 40, a cluster 50, and a switch 60.

The controller 10 may be a controller of the parking assist system (PAS). The controller 10 may be turned on and off by the operation of the switch 60 via a digital input/output (DIO) network 61, and when the controller is turned on, the controller 10 may be configured to receive information from a plurality of devices and begin the parking assist process. In addition, the controller 10 may be connected to the plurality of ultrasonic wave sensors 20, 21, 22, and 23 via a local interconnect network (LIN) 25.

As shown in FIG. 1, the plurality of ultrasonic wave sensors 20, 21, 22, and 23 may include a plurality of ultrasonic wave sensors 23 disposed at the front of a host vehicle, a plurality of ultrasonic wave sensors 20 disposed at the side of the front of the host vehicle, a plurality of ultrasonic wave sensors 22 disposed at the side of the rear of the host vehicle, and a plurality of ultrasonic wave sensors 21 disposed at the rear of the host vehicle. The plurality of ultrasonic wave sensors 20, 21, 22, and 23 may be configured to transmit distance information between the host vehicle and an external object to the controller 10.

The controller 10 may be configured to determine whether the host vehicle moves forward or backward via the wheel pulse generator 30. In addition, the controller 10 may be configured to receive information from the wheel pulse generator 30, the MDPS controller 40, and the cluster 50, and execute the components via a controller area network (CAN) 31. The controller 10 may be configured to receive information from a plurality of devices, execute them, and performs a parking assist process.

A method for parking assist according to an exemplary embodiment of the present invention will now be described with reference to FIG. 2 to FIG. 4.

Figure 2:
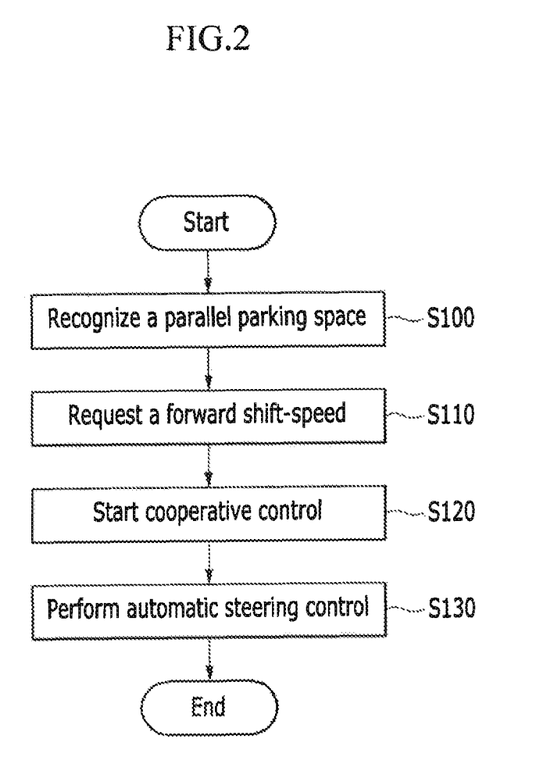
FIG. 2 is an exemplary flowchart of performing an exit from a parallel parking space according to an exemplary embodiment of the present invention.
Figure 3:
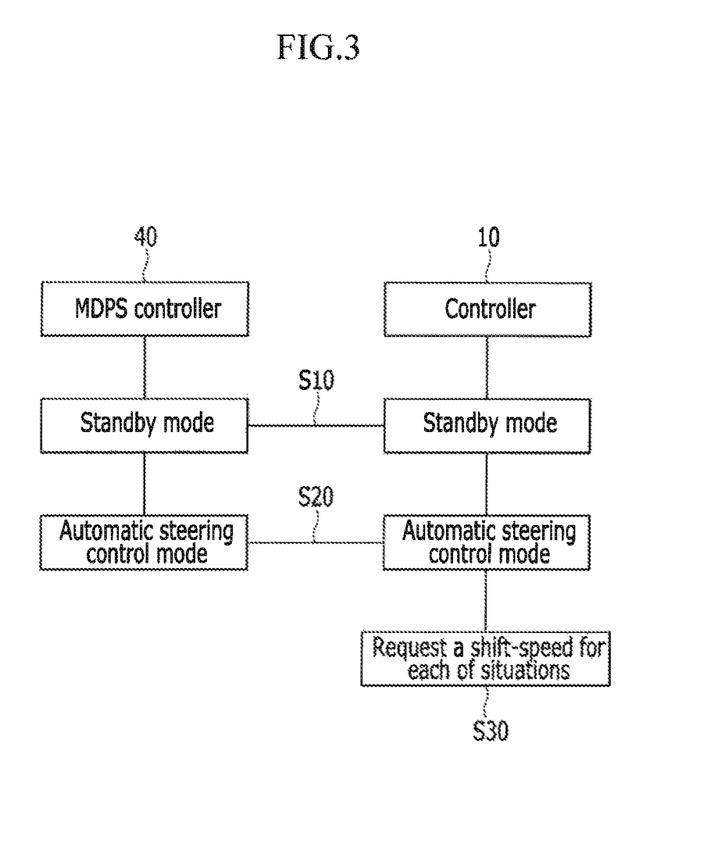
FIG. 3 is an exemplary flowchart of a controlling method between a MDPS controller and a controller according to an exemplary embodiment of the present invention.
Figure 4A:
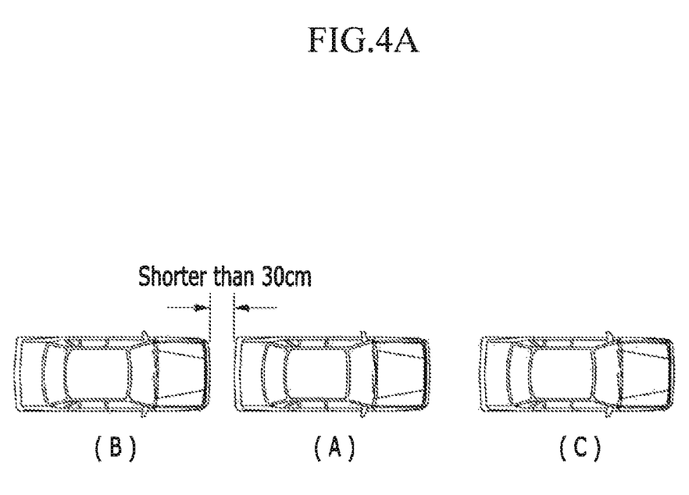
Figure 4B:
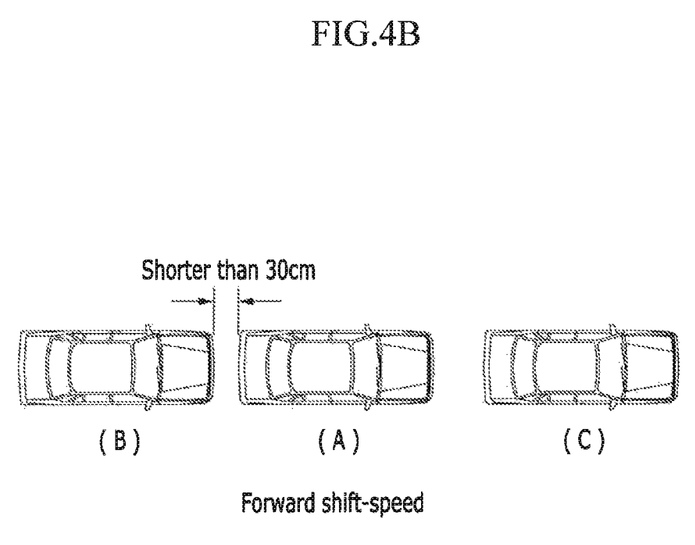
Figure 4C:
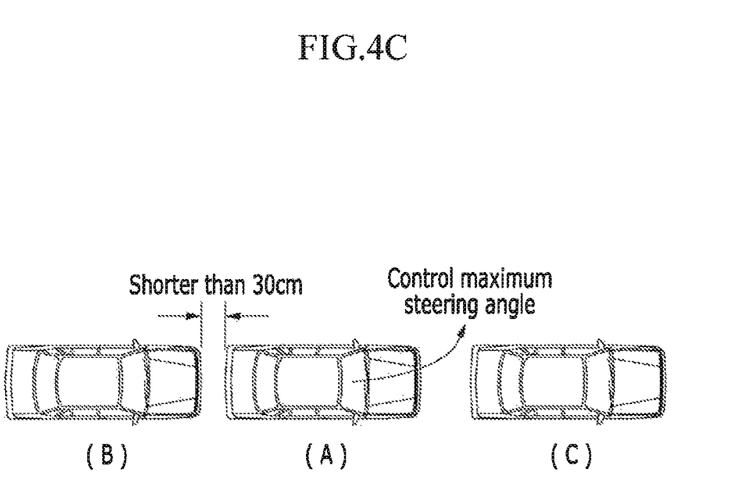

FIG. 2 is an exemplary flowchart of performing an exit from a parallel parking space according to an exemplary embodiment of the present invention, FIG. 3 is an exemplary flowchart of a controlling method between an MDPS controller and a controller according to an exemplary embodiment of the present invention, and FIG. 4A to FIG. 4C show exemplary steps of performing an exit from a parallel parking space according to an exemplary embodiment of the present invention.

An exemplary embodiment of the present invention relates to controlling a parking trajectory and steering angle by the distance between the host vehicle and a neighboring vehicle when exiting from the parallel parking space. When a driver turns on the switch 60 of the host vehicle A parked on the parallel parking space, the controller unit 10 of the parking assist system may be turned on.

The controller 10 may be configured to receive distance information between the host vehicle A and an external object from the plurality of ultrasonic wave sensors 20, 21, 22, and 23 and detect the parallel parking space at step S100. Thus, the controller 10 may be configured to determine the distance between the host vehicle A and a forward vehicle C, and the distance between the host vehicle A and a rearward vehicle B. The controller 10 may be configured to determine whether the host vehicle A moves forward or backward based on the distance between the host vehicle A and the forward vehicle C, and the distance between the host vehicle A and the rearward vehicle B.

Subsequently, at step S110, the controller 10 may be configured to request a reverse shift-speed from the driver when the host vehicle A is within a predetermined proximity with the forward vehicle C, and request a forward shift-speed from the driver when the host vehicle A is within the proximity with the rearward vehicle B.

FIG. 4A shows the host vehicle A in the predetermined proximity with the rearward vehicle B. Specifically, the predetermined proximity with the rearward vehicle B may be defined as when the distance between the host vehicle A and the rearward vehicle B is shorter than a first threshold distance. For example, the first threshold distance may be about 30 cm.

When the controller 10 determines that the host vehicle A is within the predetermined proximity with the rearward vehicle B as shown in FIG. 4A, the controller 10 may be configured to request the forward shift-speed from the driver and the forward shift-speed is determined as shown in FIG. 4B.

When the forward shift-speed is set and shift-speed information is received, the controller 10 may be configured to begin cooperative control with the MDPS controller 40 at step S120. In ether words, as shown in FIG. 3, when the switch 60 is turned on, the MDPS controller 40 and the controller 10 may enter a standby mode to prepare automatic steering at step S10, and when shift-speed information is received, the controller 10 and the MDPS controller 40 may be converted to an automatic steering control mode at step S20.

As described, when shift-speed information is received, the controller 10 and the MDPS controller 40 may perform communication for cooperative control. When the controller 10 and the MDPS controller 40 enter the automatic steering control mode, the controller 10 may be configured to request a shift-speed for each of situations from the driver at step S30, and perform automatic steering control at step S130. In other words, as shown in FIG. 4C, when the host vehicle A is within a predetermined proximity with the rearward vehicle B, the controller 10 may be configured to perform steering control to exit from the parallel parking space by controlling maximum steering angle when a forward shift-speed is determined.

When the host vehicle A is a manual transmission vehicle, the parking assist system may further include a neutral switch 70, and the controller 10 may be configured to receive shift-speed information from the neutral switch 70. When a shift-speed is not determined as neutral and a reverse shift-speed based on received shift-speed information from the neutral switch 70 is determined, the controller 10 may be configured to determine that the forward shift-speed is set and perform communication with the MDPS controller 40 for cooperative control.

Meanwhile, when the controller 10 determines that the host vehicle A is within a predetermined distance from the forward vehicle C, the controller 10 may be configured to request the forward shift-speed from the driver despite of a proximity with the rearward vehicle B, and the forward shift-speed may be determined as shown in FIG. 4B. The above-described automatic steering processes may be executed. The distance from the front vehicle C may be defined as when a distance between the host vehicle A and the front vehicle C is greater than a second threshold distance. For example, the second threshold distance may be about 35 cm.

According to an above-mentioned exemplary embodiment of the present invention, the number of shift operations and operating time of the system may be reduced by differentiating a parking trajectory when exiting from the parallel parking space. In addition, when the host vehicle is within the predetermined proximity with the rearward vehicle, the controller may be configured to request the forward shift-speed from the driver. Thus, safety be improved.

When the host vehicle is a manual transmission vehicle, it has previously been difficult to determine the forward shift-speed due to lack of reliable information. However, the reliability of forward shift-speed may be improved by additionally receiving neutral shift-speed information. In addition, the driver's intention of entering an automatic steering control mode may be determined through the forward shift-speed information.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claim.

| Description of Symbols | | |
|---|---|---|
| 20, 21, 22, 23: ultrasonic wave sensor | 10: controller | 30: wheel pulse generator |
| 40: MDPS controller | 50: cluster | |
| 60: switch | | |

What is claimed is:

1. A parking assist system, comprising:
a plurality of ultrasonic wave sensors configured to measure a distance between a host vehicle and an external object; and
a motor driven power steering (MDPS) controller configured to operate steering of the host vehicle; and
a controller configured to:
detect a parallel parking space based on distances measured from the plurality of sensors; and
perform an exit from the parallel parking space while operating steering angle via cooperative control with the MDPS controller,
wherein the controller is further configured to determine a distance between the host vehicle and a forward vehicle, and a distance between the host vehicle and a rearward vehicle, using the plurality of sensors,
wherein the controller is configured to request a forward shift-speed when the host vehicle is within a predetermined proximity with the rearward vehicle,
wherein the controller is configured to determine that the host vehicle is within the predetermined proximity with the rearward vehicle when the distance between the host vehicle and the rearward vehicle is less than a first threshold distance, and
wherein in a case that the host vehicle is a manual transmission vehicle, the system further comprises a neutral switch, and the controller is configured to receive shift-speed information from the neutral switch and determine that the forward shift-speed is set when the shift-speed is not determined as neutral and a reverse shift-speed based on received shift-speed information.

2. The parking assist system of claim 1, wherein the plurality of sensors are disposed frontward, rearward, and at both sides of the host vehicle.

3. The parking assist system of claim 1, wherein the controller is turned on and configured to perform a parking assist process when a switch is turned on when exiting from the parallel parking space.

4. The parking assist system of claim 1, wherein when the forward shift-speed is set, the controller and the MDPS controller are converted to an automatic steering control mode.

5. The parking assist system of claim 1, wherein the controller is configured to request a forward shift-speed when the host vehicle is at a predetermined distance from the forward vehicle.

6. The parking assist system of claim 5, wherein the controller is configured to determine that the host vehicle is at the predetermined distance from the forward vehicle when the distance between the host vehicle and the forward vehicle is greater than a second threshold distance.

7. The parking assist system of claim 1, wherein the plurality of sensors are a plurality of ultrasonic wave sensors.

8. A parking assist method, comprising:
- measuring, by a plurality of sensors, a distance between a host vehicle and an external object; and
- operating steering of the host vehicle, by a motor driven power steering (MDPS) controller; and
- detecting, by a controller, a parallel parking space based on distances measured from the plurality of sensors;
- determining, by the controller, a distance between the host vehicle and a forward vehicle, and a distance between the host vehicle and a rearward vehicle, using the plurality of sensors;
- requesting, by the controller, a forward shift-speed when the host vehicle is within a predetermined proximity with the rearward vehicle;
- receiving, by the controller, shift-speed information from a neutral switch;
- determining, by the controller, that the forward shift-speed is set when the shift-speed is not determined as neutral and a reverse shift-speed based on received shift-speed information; and
- performing, by the controller, an exit from the parallel parking space while operating steering angle via cooperative control with the MDPS controller.

9. The method of claim 8, wherein the plurality of sensors are disposed frontward, rearward, and at both sides of the host vehicle.

10. The method of claim 8, further comprising:
- performing, by the controller, a parking assist process when a switch is turned on when exiting from the parallel parking space when the controller is turned on.

11. The method of claim 8, further comprising:
- determining that the host vehicle is within the predetermined proximity with the rearward vehicle when the distance between the host vehicle and the rearward vehicle is less than a first threshold distance.

12. The method of claim 8, further comprising:
- requesting, by the controller, a forward shift-speed when the host vehicle is at a predetermined distance from the forward vehicle.

13. The method of claim 12, further comprising:
- determining, by the controller, that the host vehicle is at the predetermined distance from the forward vehicle when the distance between the host vehicle and the forward vehicle is greater than a second threshold distance.

* * * * *